Figure 1:
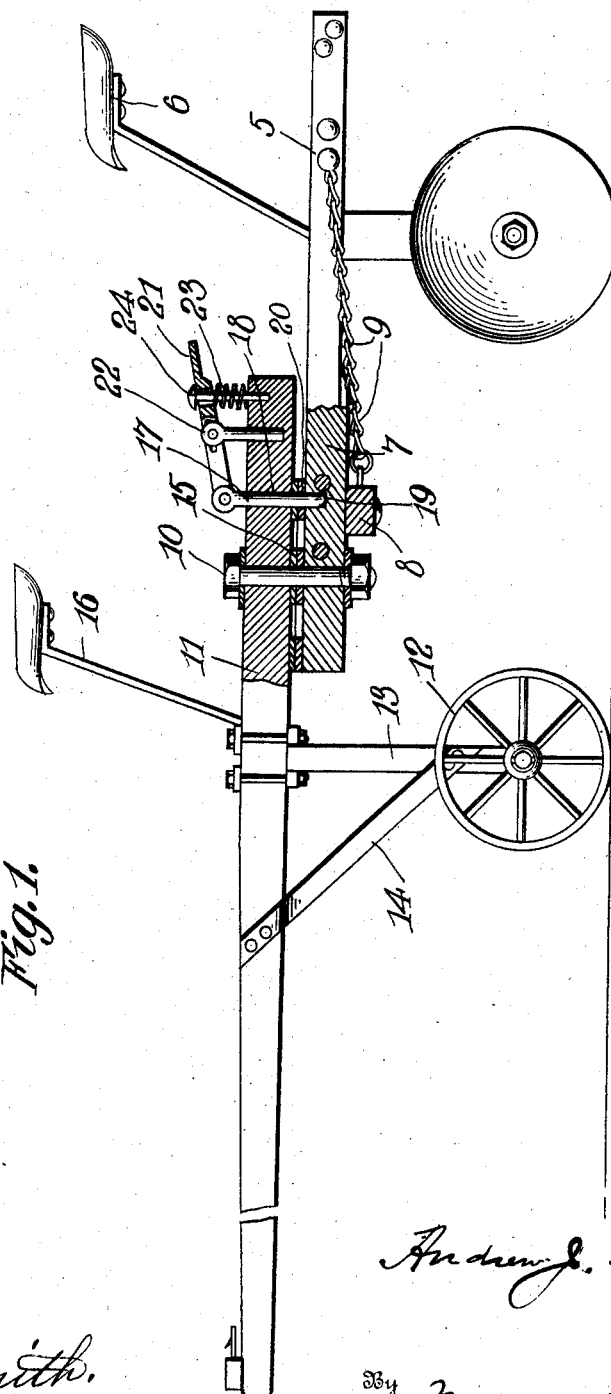

No. 864,189. PATENTED AUG. 27, 1907.
A. J. PEDDY.
DRAFT ATTACHMENT FOR AGRICULTURAL IMPLEMENTS.
APPLICATION FILED APR. 22, 1907.

2 SHEETS—SHEET 1.

Witnesses
C. E. Smith.
M. A. Schmidt.

Andrew J. Peddy,
Inventor

By M. B. Twombley
Attorneys.

No. 864,189. PATENTED AUG. 27, 1907.
A. J. PEDDY.
DRAFT ATTACHMENT FOR AGRICULTURAL IMPLEMENTS.
APPLICATION FILED APR. 22, 1907.
2 SHEETS—SHEET 2.
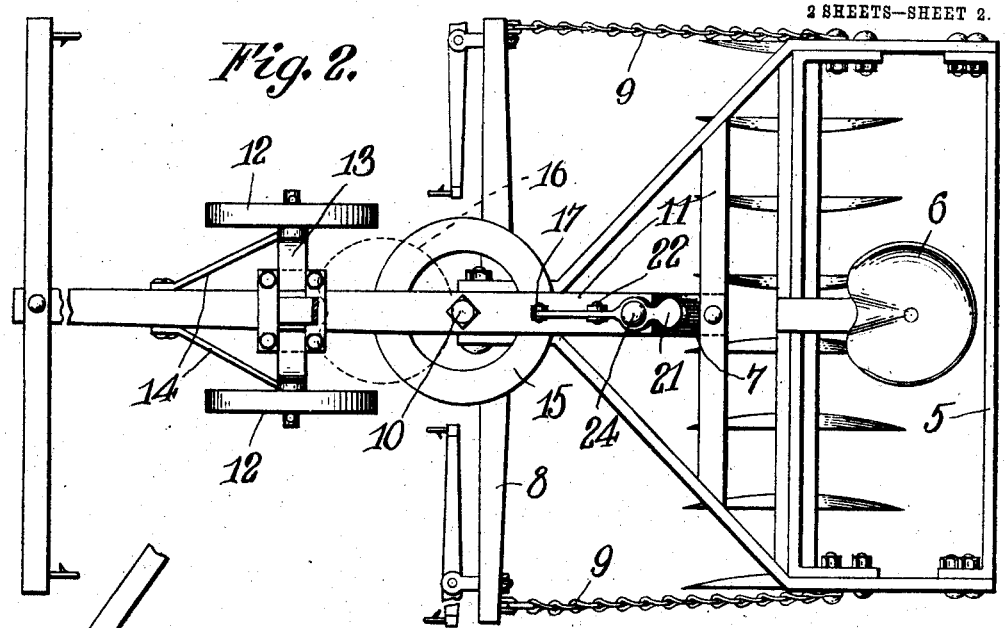
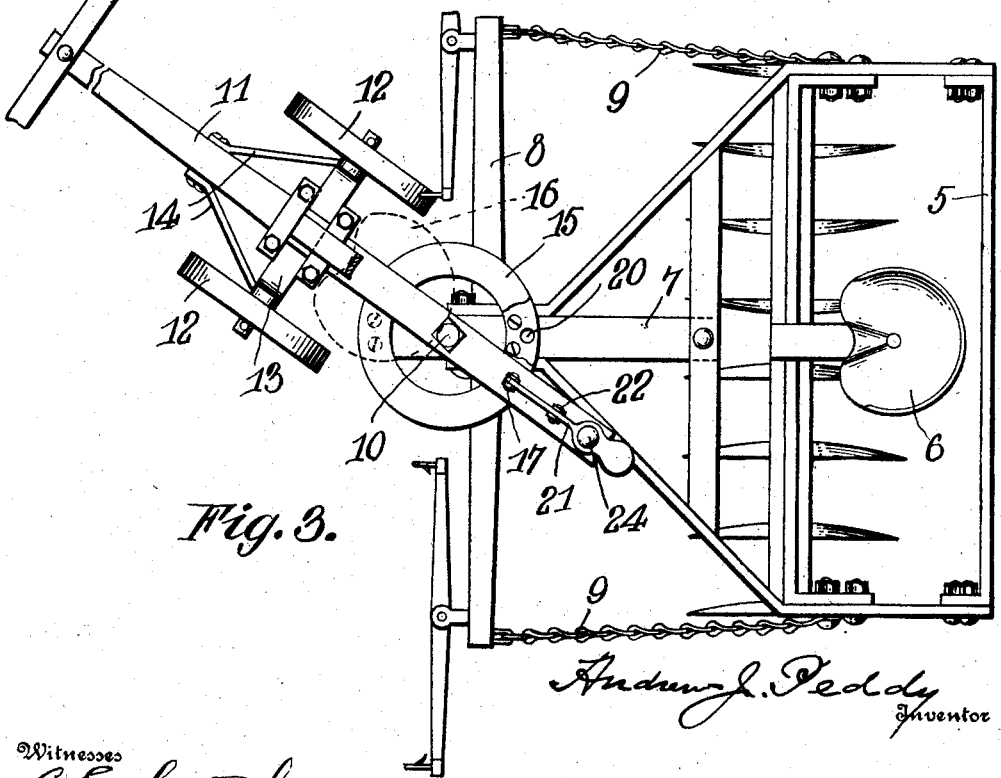

UNITED STATES PATENT OFFICE.

ANDREW JACKSON PEDDY, OF HENDERSON, TENNESSEE.

DRAFT ATTACHMENT FOR AGRICULTURAL IMPLEMENTS.

No. 864,189.  Specification of Letters Patent.  Patented Aug. 27, 1907.

Application filed April 22, 1907. Serial No. 369,535.

*To all whom it may concern:*

Be it known that I, ANDREW JACKSON PEDDY, a citizen of the United States, residing at Henderson, in the county of Chester and State of Tennessee, have invented certain new and useful Improvements in Draft Attachments for Agricultural Implements, of which the following is a specification.

This invention is a draft attachment for disk harrows and other agricultural implements, and has for its object to lighten the draft and to relieve the animals of the weight on their shoulders, and also to facilitate the turning of the implement.

In the accompanying drawings, Figure 1 is a side elevation partly in section of a disk harrow showing the application of the invention. Fig. 2 is a plan view. Fig. 3 is a plan view showing the position of the parts when making a turn.

Referring specifically to the drawings, 5 denotes the main frame of a disk harrow having a seat 6, and at its front end a stub-tongue 7 which carries a double-tree 8. The double-tree is connected at its ends by chains or other suitable means 9 to hooks on the main frame so that the pull will be directly on said frame. To the stub-tongue 7 is pivoted by a vertical bolt 10 a draft-tongue 11 which is supported on wheels 12 mounted on an arched axle 13 secured to said tongue. Suitable braces 14 for the axle are provided. If desired only one wheel can be employed. Between the tongues 7 and 11 is a fifth-wheel 15 and on the tongue 11 above the wheels 12 is a seat 16. The tongue 11 is locked to the tongue 7 by means of a pin 17 passing through openings 18 and 19, respectively, in said parts, and an opening 20 in the fifth-wheel. When making a turn the pin is withdrawn from the openings 19 and 20 which releases the tongue 11 and permits it to swing around on its pivot 10, the pin 17 sliding over the fifth-wheel. After the turn is made, the pin again comes above the openings 19 and 20, whereupon it drops thereinto and again locks the tongue 11 to the tongue 7. The pin is carried at one end of a foot lever 21 fulcrumed on a post 22 rising from the tongue 11 and is held in the openings by a spring 23 bearing on the other end of the lever. The spring is coiled around a stem 24 rising from the tongue 11 and passing loosely through a hole in the lever.

By the construction herein described a turn can be easily made as the animals pull the implement around instead of pushing it with the neck or shoulder against the draft-tongue which is injurious to the animals. The wheels 12 also relieve the animals of the weight of the tongue on their neck and shoulders.

The object of the seat 16 is to enable the driver to ride when the ground is soft. In soft ground it is often impossible for the animals to pull the implement if the driver occupies the seat 6 which is above the disks, but by using the seat 16 the driver's weight is taken off the disks and borne by the wheels 12 so that the animals will have no difficulty in pulling the implement. When the ground is hard the seat 6 will be used.

In the drawing the attachment is shown in connection with a disk harrow, but it can also be applied to cultivators and other agricultural implements, and I do not wish to be limited to the particular application shown and described herein.

I claim:—

1. The combination with the main frame of an agricultural implement, of a stub-tongue thereon, a doubletree carried by the stub-tongue and connected at its ends to the main frame, a draft-tongue pivoted to the stub-tongue, and means for locking said tongues together.

2. The combination with the main frame of an agricultural implement, of a stub-tongue thereon, a doubletree carried by the stub-tongue and connected at its ends to the main frame, a draft-tongue pivoted to the stub-tongue, supporting wheels for the draft-tongue, and means for locking said tongues together.

In testimony whereof I affix my signature, in presence of two witnesses.

ANDREW JACKSON PEDDY.

Witnesses:
 M. D. PANE,
 E. F. BOONE.